(12) United States Patent
Hallman, Jr. et al.

(10) Patent No.: US 8,262,280 B1
(45) Date of Patent: Sep. 11, 2012

(54) INTRINSICALLY SAFE MOISTURE BLENDING SYSTEM

(75) Inventors: Russell L. Hallman, Jr., Knoxville, TN (US); Paul D. Vanatta, Oak Ridge, TN (US)

(73) Assignee: Babcock & Wilcox Technical Services Y-12, LLC, Oak Ridge, TN (US)

( * ) Notice: Subject to any disclaimer, the term of this patent is extended or adjusted under 35 U.S.C. 154(b) by 0 days.

(21) Appl. No.: 13/188,665

(22) Filed: Jul. 22, 2011

(51) Int. Cl.
*B01F 15/02* (2006.01)

(52) U.S. Cl. ............... 366/152.2; 366/160.1; 366/182.4; 137/7; 261/64.3

(58) Field of Classification Search ............ 366/132, 366/134, 136, 137, 150.1–153.1, 160.1–162.1, 366/182.4; 137/3, 7, 9, 88–93, 896–898; 700/265, 266, 285; 261/129, 64.3, 43
See application file for complete search history.

(56) References Cited

U.S. PATENT DOCUMENTS

| | | | |
|---|---|---|---|
| 3,438,241 A | 4/1969 | McKinley | |
| 3,521,865 A | 7/1970 | Kertzman | |
| 3,917,453 A | 11/1975 | Milligan et al. | |
| 4,257,257 A | 3/1981 | Dairaku et al. | |
| 4,468,948 A | 9/1984 | Nakayama | |
| 4,614,438 A * | 9/1986 | Kobayashi | 366/132 |
| 4,715,217 A | 12/1987 | Coyne et al. | |
| 6,182,951 B1 * | 2/2001 | Hallman et al. | 261/130 |
| 6,439,036 B1 | 8/2002 | Mansky | |
| 6,455,007 B1 | 9/2002 | Mansky et al. | |
| 6,662,635 B2 | 12/2003 | Mansky | |
| 6,923,568 B2 * | 8/2005 | Wilmer et al. | 366/152.1 |
| 7,325,439 B2 * | 2/2008 | Hallman et al. | 73/37 |
| 7,494,114 B1 * | 2/2009 | Hallman, Jr. | 261/130 |
| 7,494,265 B2 * | 2/2009 | Niermeyer et al. | 366/152.4 |
| 8,171,775 B2 * | 5/2012 | Hallman et al. | 73/37 |
| 2004/0057334 A1 * | 3/2004 | Wilmer et al. | 366/136 |
| 2007/0074561 A1 * | 4/2007 | Hallman et al. | 73/37 |
| 2007/0206436 A1 * | 9/2007 | Niermeyer et al. | 366/152.4 |
| 2007/0295059 A2 * | 12/2007 | Hallman et al. | 73/37 |
| 2009/0116334 A1 * | 5/2009 | Niermeyer et al. | 366/145 |
| 2012/0085150 A1 * | 4/2012 | Hallman et al. | 73/38 |

FOREIGN PATENT DOCUMENTS

WO 03/087675 A1 * 10/2003

* cited by examiner

*Primary Examiner* — Charles E Cooley
(74) *Attorney, Agent, or Firm* — Michael J. Renner, Esq.; Luedeka Neely Group, P.C.

(57) ABSTRACT

A system for providing an adjustable blend of fluids to an application process is disclosed. The system uses a source of a first fluid flowing through at least one tube that is permeable to a second fluid and that is disposed in a source of the second fluid to provide the adjustable blend. The temperature of the second fluid is not regulated, and at least one calibration curve is used to predict the volumetric mixture ratio of the second fluid with the first fluid from the permeable tube. The system typically includes a differential pressure valve and a back-pressure control valve to set the flow rate through the system.

9 Claims, 3 Drawing Sheets

US 8,262,280 B1

INTRINSICALLY SAFE MOISTURE BLENDING SYSTEM

GOVERNMENT RIGHTS

The U.S. Government has rights to this invention pursuant to contract number DE-AC05-00OR22800 between the U.S. Department of Energy and Babcock & Wilcox Technical Services Y-12, LLC.

FIELD

This invention relates to the field of fluid blending systems. More particularly, this invention relates to the control of the percentage of a second fluid, such as water vapor, in a mixture with a first fluid, such as air.

BACKGROUND

Many applications in science and industry require an apparatus that creates a controlled amount of a fluid introduced into another fluid. For instance, some material corrosion testing applications require such an apparatus to determine the reaction of a material over time upon exposure to a controlled corrosive vapor-gas mixture. While various systems may be used to provide blends of two or more fluids, most such systems involve electrically-driven and/or electronically-monitored devices. A special circumstance occurs where it is necessary to provide a controlled amount of moisture in an environment that contains explosive gases. In this environment the use of electrically-driven and/or electronically-monitored devices would likely introduce a risk of explosion from an inadvertent electrical spark. Furthermore there are circumstances such as remote locations where a blend of fluids is needed and electricity is not available. What are needed therefore are methods and systems for providing a controlled blend of fluids without using electricity.

SUMMARY

The present disclosure provides a system for providing a percentage mixture of a first fluid and a second fluid. In one embodiment the system includes a source of the second fluid at an unregulated temperature. A first tube permeable to the second fluid at a first permeation rate is provided, where the first tube has a first tube first end, and a first tube second end, and a first tube middle portion that is disposed in the source of the second fluid. A differential pressure regulator is provided to set a fluid pressure drop from the first tube first end to the first tube second end. Further provided is a source of the first fluid to flow the first fluid through the differential pressure regulator into the first tube. A thermometer provides a measurement of the unregulated temperature of the source of the second fluid. A first calibration curve is provided to correlate (a) a first volumetric concentration of the first fluid flowing through the first tube and mixing with the second fluid permeating the first tube versus (b) the unregulated temperature of the source of the second fluid.

BRIEF DESCRIPTION OF THE DRAWINGS

Various advantages are apparent by reference to the detailed description in conjunction with the figures, wherein elements are not to scale so as to more clearly show the details, wherein like reference numbers indicate like elements throughout the several views, and wherein.

DETAILED DESCRIPTION

In the following detailed description of the preferred and other embodiments, reference is made to the accompanying drawings, which form a part hereof, and within which are shown by way of illustration the practice of specific embodiments of a system for providing a percentage mixture of a first fluid and a second fluid. Typically the system operates without the use of electricity, so it is "intrinsically safe." It is to be understood that other embodiments may be utilized, and that structural changes may be made and processes may vary in other embodiments.

When a conventional fluid blending system is connected to an application process that undergoes changes in pressure and/or flow rate, the blending characteristics of the fluid blending system change and the permeated fluid characteristics vary because of the change in the fluid flow rates. One way to overcome these problems is described in U.S. Pat. No. 7,494,114 to Hallman, Jr. However this system involves the use of water baths having controlled temperatures. Such water bath systems typically involve an electric water heater with an electric thermostat. Such devices may generate an electric spark and therefore may not be safe for use in an environment containing explosive gases.

Figure 1:
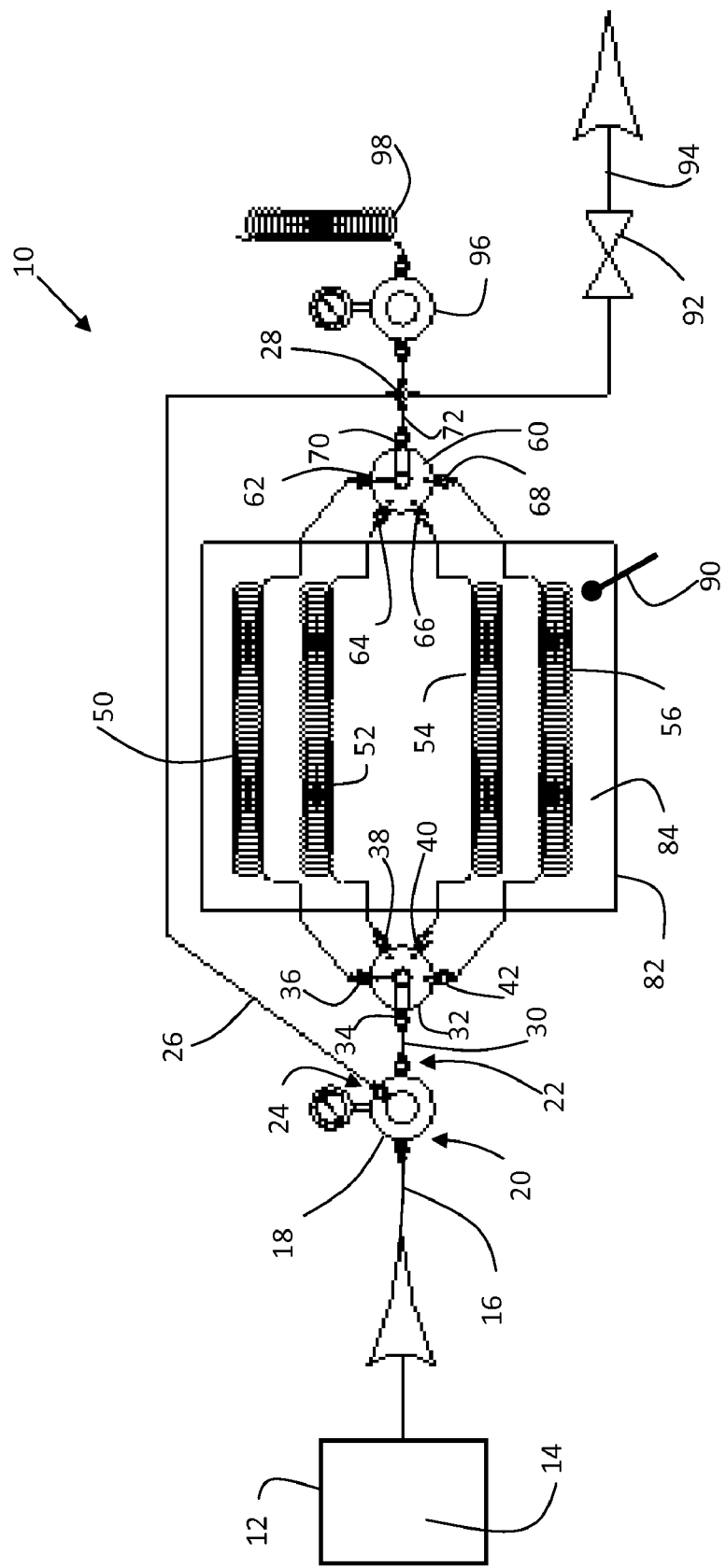
FIG. 1 is a somewhat schematic view of a system for providing a controlled percentage mixture of a first fluid and a second fluid.

FIG. 1 illustrates an embodiment of an intrinsically safe fluid blending system 10, which uses no electricity to control the ratio of blended fluids. The fluid blending system 10 comprises a first fluid source 12 that contains a first fluid 14. The first fluid source 12 is typically a pressurized tank. The first fluid 14 may be a liquid or a gas. The first fluid 14 leaves the first fluid source 12 and is fed through a feed line 16 to a differential pressure regulator 18. Many embodiments employ a dome pressure control valve from Veriflo, model IR5001S1K3P032D, part number 54012780 as the differential pressure regulator 18. Veriflo is a division of Parker instruments. The differential pressure regulator 18 has a high pressure side 20, a low pressure side 22, and a pressure reference port 24. Differential pressure regulators (such as the differential pressure regulator 18) typically use a pilot line 26 to set a fluid pressure at the low pressure side 22 that is a fixed pressure amount greater than a fluid pressure at the pressure reference port 24. In the embodiment of FIG. 1 the fluid pressure at the pressure reference port 24 is the same pressure as at the system output junction 28. The pilot line 26 is a static pressure line, i.e., no fluid flows through the pilot line 26.

In the embodiment of FIG. 1, the first fluid 14 leaves the differential pressure regulator 18 through an input line 30 and feeds a five-port first manifold 32. The five-port first manifold 32 has a first manifold input 34, and a first manifold first output port 36, a first manifold second output port 38, a first manifold third output port 40, and a first manifold fourth output port 42. Four tubes are provided, a first tube 50, a second tube 52, a third tube 54 and a fourth tube 56. Each of the four tubes has a first end and a second end and a middle portion. The first end of the first tube 50 is connected to the first manifold first output port 36, the first end of the second tube 52 is connected to the first manifold second output port 38, the first end of the third tube 54 is connected to the first manifold third output port 40, and the first end of the fourth tube 56 is connected to the first manifold fourth output port 42.

A five-port second manifold 60 is also provided. The five-port second manifold 60 has a second manifold first input port 62, a second manifold second input port 64, a second manifold third input port 66, a second manifold fourth input port 68 and a second manifold output 70. The second end of the first tube 50 is connected to the second manifold first input port 62, the second end of the second tube 52 is connected to the second manifold second input port 64, the second end of the third tube 54 is connected to the second manifold third input port 66, and the second end of the fourth tube 56 is connected to the second manifold fourth input port 68. The pilot line 26 in cooperation with the differential pressure regulator 18 establishes a fixed fluid pressure drop across the first manifold input 34 and the second manifold output 70. This also establishes a fixed fluid pressure drop across the tubes 50, 52, 54, and 56. The second manifold output 70 is connected to the system output junction 28 by an output line 72.

In typical embodiments either the five-port first manifold 32 or the five-port second manifold 60 is a five-port valve, meaning that any of the five ports may be adjusted as either open or closed such that the flow of the first fluid 14 through the first tube 50, and/or the second tube 52, and/or the third tube 54, and/or the fourth tube 56 may be opened or closed, or the first manifold input 34 may be opened or closed, or the second manifold output 70 may be opened or closed.

Both the five-port first manifold 32 and the five-port second manifold 60 may be configured as five-port valves, but generally this results in extra expense and in general it is sufficient to have just the five-port first manifold 32 or the five-port second manifold 60 configured as a five-port valve. In some embodiments the one (or each) valved port may be adjustable to provide a selectable flow rate. In some embodiments the five-port first manifold 32 (and/or the five-port second manifold 60) may be a selector valve where only one output port (in the case of the five-port first manifold 32) or one input port (in the case of the five-port second manifold 60) may be open at any time. In some embodiments the five-port first manifold 32 (and/or the five-port second manifold 60) may permit multiple output ports (in the case of the five-port first manifold 32) or multiple input ports (in the case of the five-port second manifold 60) to be open at any time.

As used herein, the term "adjustment of the first manifold first output" refers to an adjustment of a valve at the first manifold first output port 36 where that valve controls the flow of the first fluid 14 through the first tube 50 from "off" to "open" or to an intermediate (partially open) condition. The term "adjustment of first manifold second output" refers to an adjustment of a valve at the first manifold second output port 38 where that valve controls the flow of the first fluid 14 through the second tube 52 from "off" to "open" or to an intermediate (partially open) condition. Analogous terms are used to describe similar adjustments of valves at the third output port 40 and the fourth output port 42 of the five-port first manifold 32 for the purpose of controlling the flow of the first fluid 14 through the third tube 54 and the fourth tube 56, respectively.

The intrinsically safe fluid blending system 10 of FIG. 1 also includes a source 82 of a second fluid 84. The second fluid 84 may be a liquid or a gas. The source 82 of the second fluid 84 may be a pressurized or an unpressurized tank. When the second fluid 84 is a liquid, the source 82 of the second fluid 84 is typically an unpressurized tank. When the second fluid 84 is a gas, the source 82 of the second fluid 84 is typically a pressurized tank.

In an exemplary embodiment the first fluid 14 is air and the second fluid 84 is water. Such embodiments are referred to as moisture blending systems.

As illustrated in FIG. 1 a tube middle portion (depicted as a coil) of each of the tubes 50, 52, 54, and 56 is disposed (i.e., wholly or partially immersed) in the second fluid 84. The tubes 50, 52, 54 and 56 (or at least the tube middle portions) are permeable to the second fluid. In some embodiments two or more of the tubes 50, 52, 54, and 56 may have the same permeation rates. Having two tubes with the same permeation rates allows the system to double the flow rate through the system compared with having just one such tube. In some embodiments the tubes 50, 52, 54 and 56 are permeable to the second fluid at different individual permeation rates. In such embodiments the first tube 50 is permeable to the second fluid at a first permeation rate, the second tube 52 is permeable to the second fluid at a second permeation rate, the third tube 54 is permeable to the second fluid at a third permeation rate, and the fourth tube 56 is permeable to the second fluid at a fourth permeation rate. The permeation rates of the four tubes may be made different by using different lengths of the same permeable tubing. Pharmaceutical/biomedical grade US Pharmaceutical (USP) Class VI platinum-cured silicone tubing having an inside diameter of 0.030" and an outside diameter of 0.065" is an appropriate tubing for the tubes 50, 52, 54, and 56. Such tubing may be acquired as HelixMark™ tubing, REF-60-411-43, from Helix Medical, LLC.

In the embodiment of FIG. 1, the second fluid 84 has an unregulated temperature. As used herein the term "unregulated temperature" refers to a condition in which no system is provided to set the temperature of the second fluid 84, and the temperature of the second fluid 84 typically varies with the ambient temperature where the source 82 of the second fluid 84 is deployed. A thermometer 90 may be used to provide a measurement of the unregulated temperature of the second fluid 84. The thermometer 90 is typically a simple alcohol or mercury and glass thermometer rather than a digital thermometer in order to preclude the generation of an electric spark. However, in some embodiments the thermometer 90 may be an electronic thermometer that has been qualified as being safe.

To operate the intrinsically safe fluid blending system 10 in a typical mode of operation, the first manifold input 34, the first manifold first output port 36, the first manifold second output port 38, the first manifold third output port 40, the first manifold fourth output port 42, the second manifold first input port 62, the second manifold second input port 64, the second manifold third input port 66, the second manifold forth input port 68, and the second manifold output 70 are all configured to be open. In this configuration the first fluid 14 exits the first fluid source 12 and flows through the feed line 16 to the differential pressure regulator 18. The first fluid 14 then flows through the input line 30 into the five-port first manifold 32. Then portions (typically equal portions) of the first fluid 14 flow into the first tube 50, the second tube 52, the third tube 54 and the fourth tube 56. When first fluid 14 passes through the middle (coiled) portions of tubes that are disposed in the second fluid 84, an amount of the second fluid 84 permeates the tube (at the tube's individual permeation rate) and is mixed with first fluid 14 creating a blended fluid at a volumetric mixture ratio. The volumetric mixture ratio for a tube is the volume ratio of the second fluid 84 that permeates that tube divided by the sum of the volumes of that the second fluid 84 plus the first fluid 14 flowing through that tube. The blended fluid in each of the tubes are combined by the five-port second manifold 60 and leave the five-port second manifold 60 through the output line 72 at a blended fluid output rate and blended fluid output pressure at the system output junction 28.

The term "adjustment of second manifold first input" refers to an adjustment of a valve at the second manifold first input port 62 that controls the flow of the first fluid 14 through the first tube 50 from "off" to "open" or an intermediate (partially open) condition. The term "adjustment of second manifold second input" refers to an adjustment of a valve at the second manifold second input port 64 that controls the flow of the first fluid 14 through the second tube 52 from "off" to "open" or an intermediate (partially open) condition. Analogous terms are used to describe similar adjustments of valves at the second manifold third input port 66 and the second manifold fourth input port 68 for the purpose of controlling the flow of the first fluid 14 through the third tube 54 and the fourth tube 56. Controlling the flow of the first fluid 14 through the first tube 50 by use of a valve at the second manifold first input port 62, for example, also controls the flow of the second fluid 84 through the first tube 50, since the second fluid 84 permeates the first tube 50 and is entrained with the first fluid 14 when the mixture reaches the five-port second manifold 60.

While the embodiment of FIG. 1 has four tubes (50, 52, 54, and 56,) other embodiments may employ fewer tubes or more tubes. Only the use of at least one permeable tube is required. If only one tube is used there is no need for manifolds. Some embodiments may employ at least one impermeable tube, which is in addition to at least one permeable tube. The impermeable tube may be used for such purposes as flow calibration or providing a pure source of the first fluid 14. If multiple tubes are used, the manifolds (i.e., the five-port first manifold 32 and the five-port second manifold 60) are typically configured so that the number of outputs provided by the first manifold and the number of inputs provided by the second manifold each equal the number of tubes employed.

In the embodiment of FIG. 1 the system output junction 28 is connected to a process valve 92, from which blended fluid may be provided to an application system through a process feed line 94. In the embodiment of FIG. 1 the system output junction 28 is also connected to a back pressure control valve 96, which is adjusted to a back pressure setting. The most preferred embodiments employ a Veriflo back pressure control valve model ABP3SV23BP0321, part number 44200430. The back pressure setting of the back pressure control valve 96 further controls the operation of fluid blending system 10. Typically the back pressure is set at a pressure that is equal to or greater than the minimum desired blended fluid output pressure supplied to an application process through the process valve 92 and the process feed line 94. In the most preferred embodiments, the input port of the back pressure control valve 96 is physically close enough to the input port of the process valve 92 that the pressure at both locations is substantially the same. In that configuration, the pressure setting of the back pressure control valve 96 sets the blended fluid output pressure that is provided to the application process. If the back pressure control valve 96 is physically distant from the input port of the process valve 92 then differences in pressures between the back pressure control valve 96 and the process valve 92 need to be accounted for in the back pressure setting of the back pressure control valve 96.

The back pressure control valve 96 maintains a fixed pressure downstream from the tubes 50, 52, 54 and 56. The pilot line 26 provides a means for the differential pressure regulator 18 to sense the down-stream pressure and thereby maintain a controlled pressure upstream from the tubes 50, 52, 54, and 56. That is, the cooperative combination of the pilot line 26 and the differential pressure regulator 18 maintains a fixed pressure drop across tubes 50, 52, 54, and 56, and in particular, the combination maintains a fixed pressure drop across center sections of the tubes 50, 52, 54, and 56 that are disposed in the second fluid 84. For a specific unregulated temperature of the second fluid, that fixed pressure drop ensures a fixed flow rate through each tube and thus also ensures a substantially fixed volumetric mixture ratio of the second fluid at a value that is constant for each tube, but that may be different between tubes (if they have different permeation rates).

Figure 2:
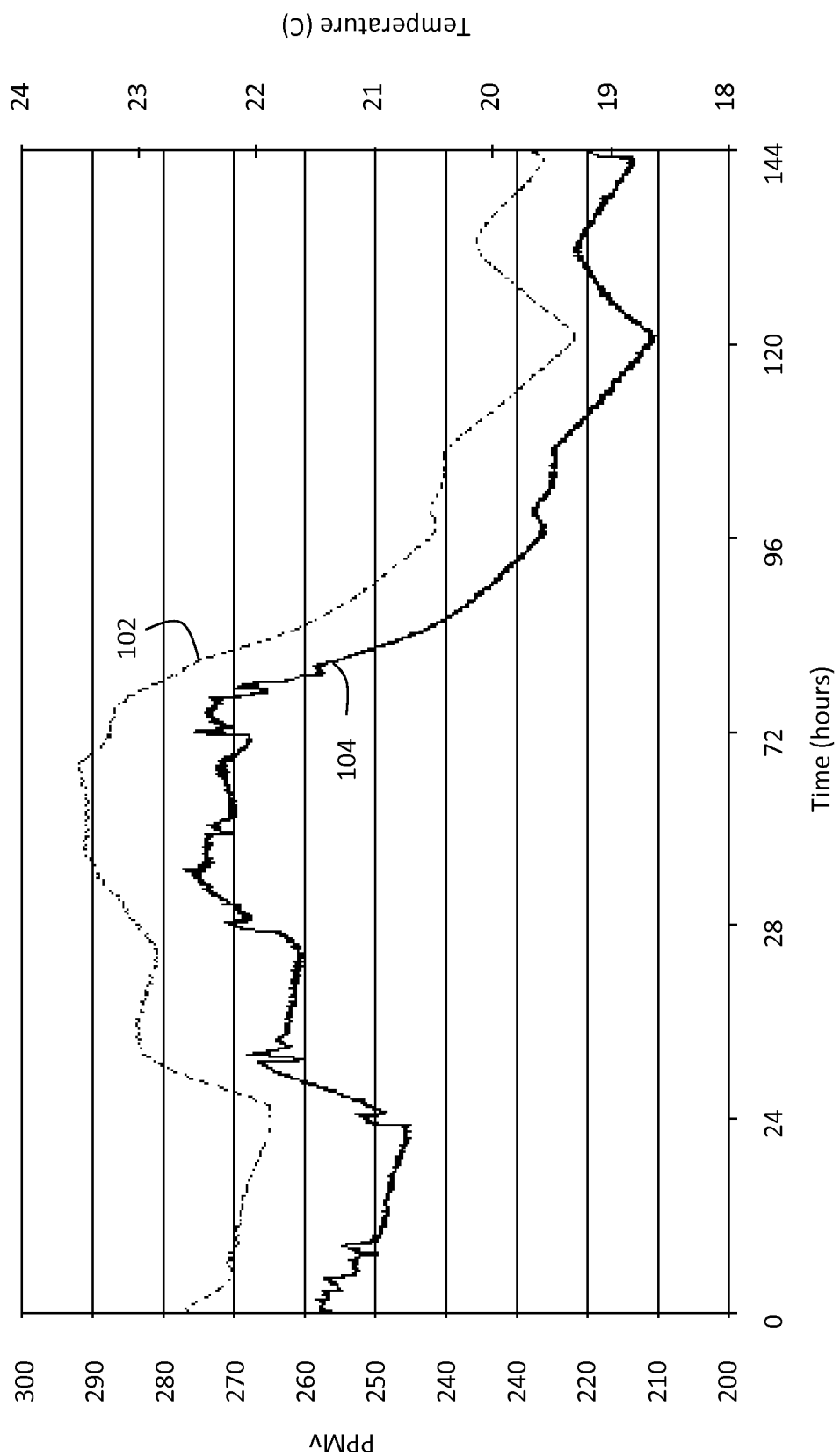
FIG. 2 is a graph showing temperature data and moisture concentration data for a portion of a system for providing a controlled percentage mixture of a first fluid and a second fluid.
Figure 3:
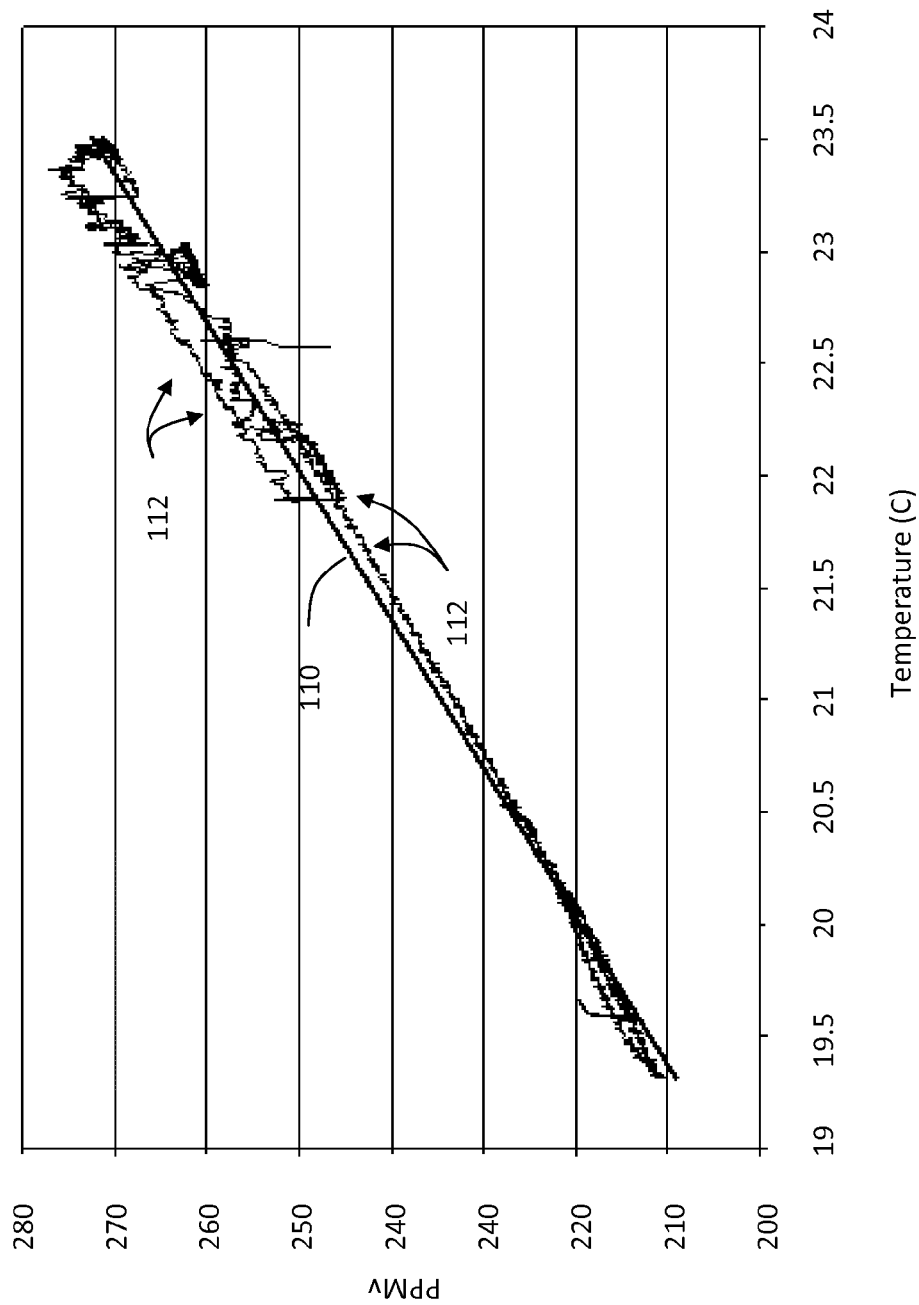
FIG. 3 is a graph showing a linear correlation factor for the temperature data and the moisture concentration data of FIG. 2.

However, at a constant pressure drop, as the temperature varies the volumetric mixture ratio changes. This is illustrated in FIG. 2 which presents a 6-day section of data collected for a particular permeable tube in a moisture blending system. The top line 102 of the graph is the recorded temperature and the bottom line 104 of the graph is the recorded moisture response. The moisture response varied between about 200 PPMv to 300 PPMv as the temperature varied between about 19° C. to about 24° C. However, as illustrated in FIG. 3, there is typically good correlation between the volumetric mixture ratio and the unregulated temperature. A best-fit linear regression line 110 has the formula of Eq'n 1.

$$PPMv = 15.108T - 82.655 \qquad \text{Eq'n 1}$$

The correlation coefficient between the linear regression line 110 and the data 112 is given by Eq'n 2.

$$R^2 = 0.9879 \qquad \text{Eq'n 2}$$

Typically data such as presented in FIGS. 2 and 3 are gathered and calculated for each of the tubes 50, 52, 54, and 56. The best-fit linear regression line (e.g., 110) for each tube is used as its calibration curve showing the volumetric concentration of the second fluid 84 in the first fluid 14 as a function of the temperature of the second fluid 84. As previously indicated, each tube may be configured to generate a different range of volumetric mixture ratios over a common range of temperatures. So, for example, in an exemplary embodiment of an intrinsically safe moisture blending system, one tube may have a permeability selected to nominally provide 50 PPMv of moisture, another tube may have a permeability selected to nominally provide 150 PPMv of moisture, and another tube may have a permeability selected to nominally provide 300 PPMv of moisture. In such embodiments each tube has its own calibration curve.

In some embodiments it may be useful to provide an impermeable tube, which provides 0 PPMv percentage mixture of the second fluid with the first fluid. Fluid from this tube (having 100% first fluid and 0% of the second fluid, and as such having the lowest volumetric mixture ratio of any of the tubes) may be mixed with blended fluid from the tube having the second-lowest volumetric mixture ratio to create a very low volumetric mixture ratio. A tube for providing 0 PPMV of moisture may be fabricated using impermeable tube material (such as a brass tube) in place of the permeable tube material (such as silicone rubber) that is used to fabricate the other tubes.

Referring again to FIG. 1, to set the volumetric moisture concentration of blended fluid in the process feed line 94 an operator may check the temperature of the second fluid 84 using the thermometer 90. Then the volumetric mixture ratio emanating from each of the tubes 50, 52, 54, and 56 may be calculated using a calibration curve (e.g., Eq'n 1) that is typically different for each of the tubes. The valves in either the five-port first manifold 32 or the five-port second manifold 60 may be opened or closed to select the tube or combination of tubes that will provide the desired volumetric mixture ratio.

If multiple tubes (e.g., tubes 50, 52, 54, and 56) are used simultaneously, then the calibration curve for each tube is used to calculate the PPMv from that tube. If each tube has the same flow rate, then the PPMv of the second fluid 84 in the first fluid 14 in the blended fluid that is provided to the application system through the process feed line 94 is the average of the PPMv values. If the tubes have different flow rates, then the PPMv of the second fluid 84 in the first fluid 14 in the blended fluid that is provided to the application system is the weighted average (based on flow rates) of the PPMv values. For example, if two tubes are used and the first tube is providing 10 cc/min of fluid at 100 PPMv of the second fluid in the first fluid and the second tube is providing 30 cc/min of fluid at 200 PPMv of the second fluid in the first fluid, then the percentage mixture of the second fluid in the first fluid that is provided to the application system is given by Eq'n 3.

$$\frac{(10 \times 100) + (30 \times 200)}{(10 + 30)} = 175 \text{ PPMv} \qquad \text{Eq'n 3}$$

The pressure drop across the differential pressure regulator 18 may be adjusted to change the blended fluid output rate. A higher pressure differential will increase the blended fluid output rate and a lower pressure differential will decrease the blended fluid output rate. Of course increasing the differential pressure increases the first fluid volumetric flow rate, but the rate of permeation of the second fluid remains the same. As a result, the volumetric mixture ratio changes. Consequently, the calibration curves (e.g., Eq'n 1) for the four tubes need to be recalculated for different pressure drops. It is sometimes useful to provide multiple calibration curves showing PPMv vs. temperature for a plurality of pressure differentials.

While the embodiment of FIG. 1 is directed toward being intrinsically safe by not using electrical energy that could cause a spark, other embodiments directed toward applications in remote regions where electricity is not available (and electrical sparks are not a concern) may use low power electrical sources (such as batteries) to operate certain aspects of the system, such as measuring the temperature of the second fluid 84 and turning valves. Such embodiments directed toward applications in remote regions may also use low power consumption electronic devices to adjust the valves according to an electronically-stored calibration curve. However, all such embodiments whether in an explosive environment or in a remote environment employ a source of the second fluid at an unregulated temperature.

It was previously stated that the back pressure control valve 96 should be set at a pressure that is equal to or greater than the desired delivery pressure. The reason for this is that most application processes have some device such as a valve or regulator that throttles either the pressure and/or flow rate being introduced into the application process based on the fluid demand of the process. (However, for those application processes that specify a desired delivery pressure and cannot tolerate and have no means to regulate higher pressures, then the back pressure control valve should be set equal to the desired delivery pressure.) Any pressure greater than the desired delivery pressure will provide a reserve to meet times of high demand or quick response. For example, if an application process needs a minimum of 10 psi but it occasionally needs higher pressures, then the range of available blended fluid output pressure can be increased simply by increasing the setting on the back pressure control valve 96. To illustrate this, suppose that initially the back pressure control valve 96 is set to "0" psi (gauge) back pressure, meaning that it is set to atmospheric pressure (approximately 15 psi absolute pressure). Suppose further that differential pressure regulator 18 is set to maintain a 15 psi gauge pressure level above the back pressure (which corresponds to 30 psi absolute pressure). In this configuration the pressure at the low pressure side 22 of differential pressure regulator 18 will be the difference between the back pressure control valve 96 setting and the differential pressure regulator setting, or 15 psi. (This assumes a sufficiently high pressure of first fluid 14 in first fluid source 12, which in this case would have to be higher than 30 psi absolute pressure.)

Now, suppose the back pressure control valve 96 is reset to 15 psi gauge back pressure (i.e., approximately 30 psi absolute pressure). That new pressure setting is fed back to differential pressure regulator 18 through pilot line 26, and the differential pressure regulator 18 increases the fluid pressure at the low pressure side 22 by the fixed amount of 15 psi to a new level of 30 psi gauge (45 psi absolute). The pressure drop across the tubes 50, 52, 54, and 56 is not changed (it remains at 15 psi) so the volumetric flow rate of the blended fluid remains constant (while doubling the mass flow rate because of the doubling of the back pressure), and the available blended fluid output pressure is now 15 psi gauge (or 30 psi absolute). It should be noted that the moisture permeation rate has not changed (as long as the unregulated temperature of the second fluid 84 has not changed), but the moisture content is now half of its former amount because the mass flow rate has doubled due to the doubling of the back pressure.

There are several important factors regarding the application process using the blended fluid that need to be considered in the design of a fluid blending system. In particular, it is important to know the maximum pressure that will be applied by the application process to the output line of the fluid blending system. The blended fluid system should be designed to ensure that the blended fluid output pressure is greater than the maximum pressure applied by the application process. If, on the other hand, the operating pressure of the application process that is being fed by the process feed line 94 is greater than the blended fluid output pressure, then the mixture of blended fluid will flow from the output line 72 out through the back pressure control valve 96. Also, it is important to know the maximum volumetric rate at which the application process expects to receive the blended fluid, and design the fluid blending system to produce blended fluid at a rate at least as great as the maximum process usage rate at the designed process operating pressure. If the application process draws blended fluid at a rate that exceeds the capacity of the fluid system blending system, the drop in pressure below the designed operating pressure of the back pressure control valve 96 will result in a high delta pressure across the tubes 50, 52, 54 and 56 and thus an increase in the blended fluid flow rate and a decrease in the permeated fluid content of the blended fluid mixture.

Continuing in reference to FIG. 1, the most preferred embodiments incorporate a process valve 92. The process valve 92 permits the supply of blended fluid to be turned on and off without affecting the volumetric mixture ratio. When the application process does not need blended fluid, then the process valve 92 is turned off (called the standby mode) so that all of the blended fluid output is diverted to the back pressure control valve 96 which expels the blended fluid through exhaust line 98. This mode of operation does not affect the blended fluid output pressure, so the volumetric mixture ratio is unchanged. When the application process needs blended fluid, then the process valve 92 is opened (called the operational mode) so that some portion of the blended fluid is provided to the application process through a process feed line 94. This mode of operation does not affect the blended fluid output pressure at output line 72, provided the volume supplied through the process valve 92 does not exceed the maximum flow rate of the system, so the volumetric mixture ratio remains unchanged. In the operational mode the flows through valves 92 and 96 sum to a constant total flow rate although the proportions may vary from 0:100% to 100:0%. If the flow through the process valve 92 exceeds the flow rate normally produced by the pressure drop as governed by the back pressure control valve 96, then the output pressure must drop as the output flow increases. This would upset the blending ratio by providing more unblended first fluid for the same amount of permeated second fluid, resulting in a lower permeated fluid content. While in the operational mode, the internal operating pressure of the application process is "fed back" to the fluid blending system through the process feed line 94, and the internal operating pressure of the application process may vary. As long as the fluid blending system 10 in FIG. 1 is designed so that the blended fluid output pressure is greater than the maximum internal operating pressure of the application process, variations in the internal operating pressure of the application process do not affect the blended fluid output pressure, so the volumetric mixture ratio remains unchanged during such variations in the application process. Thus, fluid blending system 10 in FIG. 1 is able, within its capacity, to provide a variable amount of blended fluid to an application process while maintaining the blended fluid at a fixed volumetric mixture ratio.

In summary, embodiments disclosed herein provide intrinsically safe fluid blending systems. The foregoing descriptions of embodiments have been presented for purposes of illustration and exposition. They are not intended to be exhaustive or to limit the embodiments to the precise forms disclosed. Obvious modifications or variations are possible in light of the above teachings. The embodiments are chosen and described in an effort to provide the best illustrations of principles and practical applications, and to thereby enable one of ordinary skill in the art to utilize the various embodiments as described and with various modifications as are suited to the particular use contemplated. All such modifications and variations are within the scope of the appended claims when interpreted in accordance with the breadth to which they are fairly, legally, and equitably entitled.

What is claimed is:

1. A system for providing a percentage mixture of a first fluid with a second fluid comprising:
   a source of the second fluid at an unregulated temperature;
   a first tube permeable to the second fluid at a first permeation rate, the first tube having a first tube first end, and a first tube second end, and a first tube middle portion that is disposed in the source of the second fluid;
   a differential pressure regulator to set a fluid pressure drop from the first tube first end to the first tube second end;
   a source of the first fluid to flow the first fluid through the differential pressure regulator into the first tube;
   a thermometer to provide a measurement of the unregulated temperature of the source of the second fluid; and
   a first calibration curve to correlate (a) a first volumetric concentration of the first fluid flowing through the first tube and mixing with the second fluid permeating the first tube versus (b) the unregulated temperature of the source of the second fluid.

2. The system of claim 1 wherein the percentage mixture of the first fluid with the second fluid is calculated using (a) the measurement of the unregulated temperature of the source of the second fluid from the thermometer and (b) the first calibration curve.

3. The system of claim 1 further comprising a back pressure control valve to set the pressure at the first tube second end.

4. The system of claim 1 further comprising:
   a second tube permeable to the second fluid at a second permeation rate, the second tube having a second tube first end, and a second tube second end, and a second tube middle portion that is disposed in the source of the second fluid;
   a three-port first manifold having a first manifold input and a first manifold first output and a first manifold second output, wherein the first end of the first tube is connected to the first manifold first output and the first end of the second tube is connected to the first manifold second output;
   a three-port second manifold having a second manifold first input and a second manifold second input and second manifold output, wherein the second end of the first tube is connected to the second manifold first input and the second end of the second tube is connected to the second manifold second input; and
   a second calibration curve to correlate (c) a second volumetric concentration of the first fluid flowing through the second tube and mixing with the second fluid permeating the second tube versus (d) the unregulated temperature of the source of the second fluid; wherein
   the differential pressure regulator sets the fluid pressure drop from the first manifold input to the second manifold output,
   the source of the first fluid flows the first fluid through the differential pressure regulator into the first manifold input, and
   the mixture of the first fluid and the second fluid is provided at the second manifold output.

5. The system of claim 4 wherein the percentage mixture of the first fluid with the second fluid is calculated using (a) the measurement of the unregulated temperature of the source of the second fluid from the thermometer, and (b) the first calibration curve, and (c) the second calibration curve.

6. The system of claim 4 further comprising a back pressure control valve to set the pressure at the second manifold output.

7. The system of claim 1 further comprising:
   a second tube impermeable to the second fluid, the second tube having a second tube first end and a second tube second end;
   a three-port first manifold having a first manifold input and a first manifold first output and a first manifold second output, wherein the first end of the first tube is connected to the first manifold first output and the first end of the second tube is connected to the first manifold second output; and
   a three-port second manifold having a second manifold first input and a second manifold second input and second manifold output, wherein the second end of the first tube is connected to the second manifold first input and the second end of the second tube is connected to the second manifold second input; wherein
   the differential pressure regulator sets the fluid pressure drop from the first manifold input to the second manifold output, the source of the first fluid flows the first fluid through the differential pressure regulator into the first manifold input, and the mixture of the first fluid and the second fluid is provided at the second manifold output.

8. The system of claim 7 wherein the percentage mixture of the first fluid with the second fluid is calculated using (a) the measurement of the unregulated temperature of the source of the second fluid from the thermometer, and (b) the first calibration curve, and (c) a 0 PPMv percentage mixture of the first fluid with the second fluid through the second tube.

9. The system of claim 7 further comprising a back pressure control valve to set the pressure at the second manifold output.

* * * * *